(12) United States Patent
Sheleheda et al.

(10) Patent No.: US 8,661,147 B2
(45) Date of Patent: Feb. 25, 2014

(54) MONITORING REQUESTED CONTENT

(75) Inventors: Daniel G. Sheleheda, Florham Park, NJ (US); Edward G. Amoroso, Andover, NJ (US); Cynthia Cama, Belmar, NJ (US); Sanjay Macwan, Marlboro, NJ (US); William O'Hern, Spring Lake, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 365 days.

(21) Appl. No.: 12/333,550

(22) Filed: Dec. 12, 2008

(65) Prior Publication Data

US 2010/0153566 A1    Jun. 17, 2010

(51) Int. Cl.
    *G06F 17/30* (2006.01)
(52) U.S. Cl.
    USPC ............................................. 709/229
(58) Field of Classification Search
    USPC ............................................. 709/229
    See application file for complete search history.

(56) References Cited

U.S. PATENT DOCUMENTS

| 7,389,346 | B2 | 6/2008 | Reasor et al. | |
| 7,869,792 | B1* | 1/2011 | Zhou et al. | 455/411 |
| 2002/0199184 | A1 | 12/2002 | Cezeaux | |
| 2004/0003071 | A1* | 1/2004 | Mathew et al. | 709/223 |
| 2005/0228881 | A1* | 10/2005 | Reasor et al. | 709/224 |
| 2005/0251827 | A1* | 11/2005 | Ellis et al. | 725/47 |
| 2006/0098670 | A1* | 5/2006 | Voit et al. | 370/401 |
| 2007/0180100 | A1 | 8/2007 | Biggs et al. | |
| 2007/0180463 | A1* | 8/2007 | Jarman | 725/28 |
| 2007/0250854 | A1* | 10/2007 | Miyabayashi et al. | 725/34 |
| 2008/0148310 | A1* | 6/2008 | Strickland | 725/30 |
| 2009/0007018 | A1* | 1/2009 | Ikeda et al. | 715/838 |

* cited by examiner

*Primary Examiner* — Sulaiman Nooristany
(74) *Attorney, Agent, or Firm* — Jackson Walker L.L.P.

(57) ABSTRACT

Requested content is monitored and metadata for the content is accessed and reported to an administrator communication device. The reported metadata may be indicative of a classification of the requested content, an address of the requested content, a title of the requested content, or portions (e.g., video images) of the requested content. Administrators are enabled to receive dynamic updates regarding requested and received content in real time and may block viewer requested content or send messages to the viewer that are related to the content.

14 Claims, 4 Drawing Sheets

MONITORING REQUESTED CONTENT

BACKGROUND

1. Field of the Disclosure

The present disclosure generally relates to content delivery networks and more particularly to providing messages to administrators indicative of requested or received content.

2. Description of the Related Art

Data that identifies content received over the Internet (e.g., Web content) may be logged to an electronic file that may be accessed later by an administrator. Requested content may be blocked by administrator configured systems to prevent unauthorized viewer access.

DESCRIPTION OF EXEMPLARY EMBODIMENTS

Figure 1:
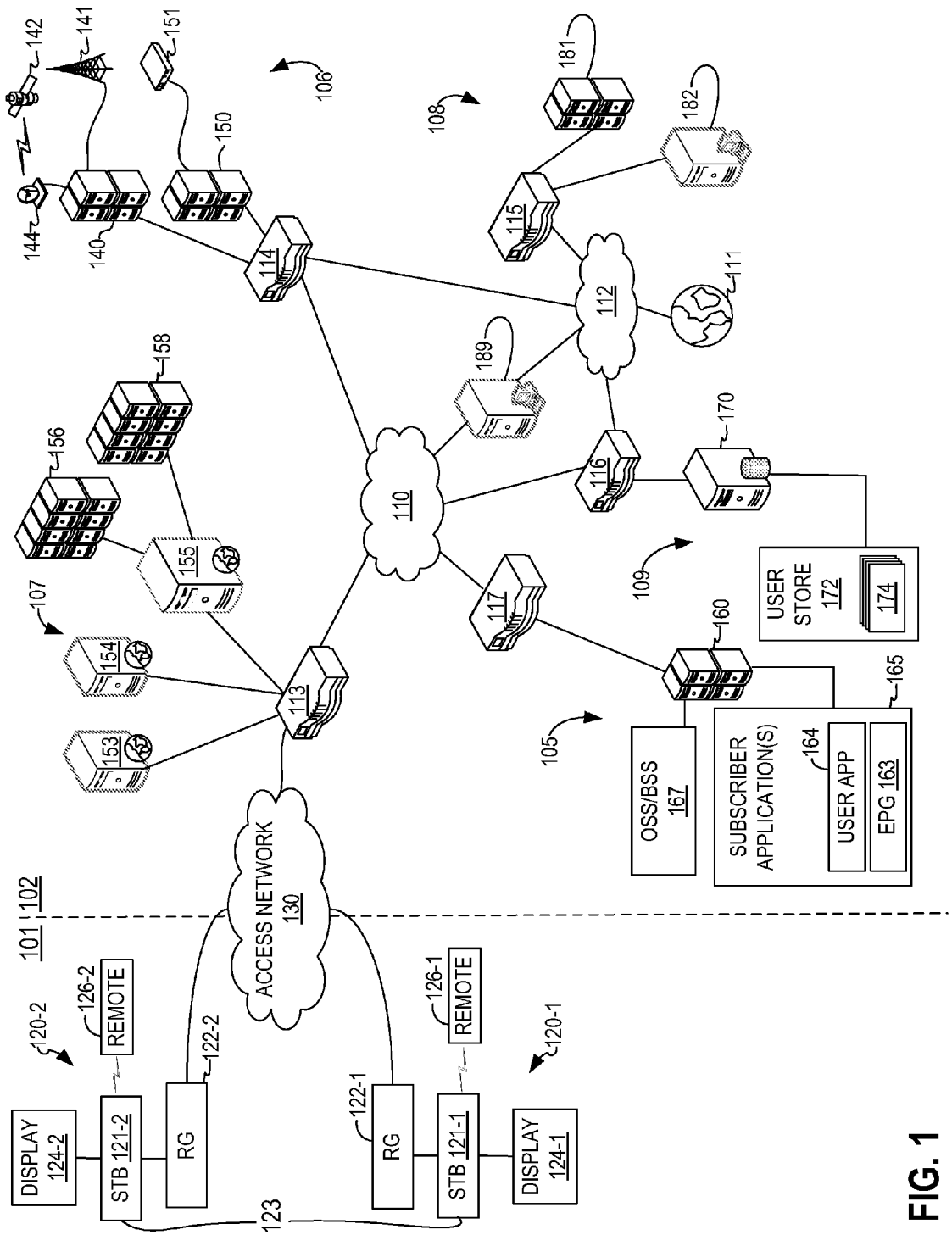
FIG. 1 illustrates an exemplary Internet Protocol Television (IPTV) architecture for monitoring and reporting Web usage and television usage.

As described in greater detail, disclosed embodiments provide administrators messages regarding received or requested content. In one aspect, a disclosed method of monitoring metadata for content requested from a multimedia content distribution network includes receiving a viewer request to receive the content, accessing metadata for the requested content, and reporting the metadata to an administrator communication device. The metadata may include portions of the requested content (e.g., video images), a classification of the requested content, an address of the requested content, or a title of the requested content. In some embodiments, the method includes presenting an administrative message to the viewer that may be an overlay to the requested content (e.g., a multimedia program or website). Administrator messages may be sent to wireless telephony devices (e.g., cellular telephones) or other data processing systems (e.g., desktop computers). In some embodiments, an administrator may interactively block viewer access to the requested content in real time and in response to receiving metadata that the requested content is objectionable.

In another aspect, a disclosed system for reporting metadata for content requested from a multimedia content distribution network includes a data collection module for accessing metadata indicative of the content and a network interface for transporting the metadata to an administrator communication device substantially in real time with the viewer request. Accessing the metadata indicative of the content, in some embodiments, is responsive to a viewer request to receive the content. Transporting the metadata may occur in response to determining that the metadata meets or exceeds a predetermined rating. The metadata may be sent to the administrator by various means such as e-mail, instant message, and text message. Administrators may provide administrator input to block the requested content from the viewer. The metadata may include a multimedia program type, a multimedia program rating, a multimedia program title, or video images (e.g., streaming video) from the requested content.

In still another aspect, a plurality of computer instructions stored on a tangible computer readable medium includes instructions for monitoring content provided to a viewer device, accessing metadata for the monitored content, and transmitting the metadata to an administrator communication device at least substantially in real time with the monitoring. The metadata may include video images (e.g., streaming video) from the content.

Disclosed embodiments provide administrators with monitoring and reporting services for content requested by viewers. An administrator may receive real-time reports as a viewer requests Web content (i.e., content from the World Wide Web) or television content. The administrator may be remote from the location of the viewer and may receive messages over a mobile telephony device (e.g., a mobile telephone). Monitored data may also be reported and accessed through a service portal. If regulations or laws require notification of the monitoring or reporting conducted by disclosed embodiments, the viewer may be notified accordingly.

In accordance with disclosed embodiments, administrators or other authorized persons (e.g., parents) may receive a dynamic feed of Web addresses, received content, identifiers for television programming, and the like. Such information may be received from metadata associated with received content, and a portion of the metadata may be forwarded to an administrator device or used to create a message that is formatted for sending to the administrator device. Disclosed embodiments may include encryption and other security measures to reduce the chance that a viewer subverts the monitoring and reporting process.

In addition to reporting services offered by disclosed embodiments, an administrator may set predetermined parameters that automatically block content requested by a viewer. In some embodiments, an administrator triggers the blocking of requested content in response to receiving and reviewing metadata (e.g., a multimedia program title or rating) associated with requested content that is objectionable. In addition to blocking content, an administrator may send messages (e.g., a pop-up message) to the viewer. Messages sent to the viewer may be sent to a display used to view the requested content or to a viewer device such as a mobile telephony device that is separate from the display used to view the requested content. For example, a parent may send a child a message to discontinue viewing objectionable content (e.g., a television show).

Disclosed embodiments provide administrators the ability to receive in real time (or near real time) feeds describing or containing content requested by viewers. The term "near real time" is intended to include systems that are intended to function in real time but may encounter processing delays, network delays, propagation delays, and the like that may slow down a process such as sending messages to an administrator through an administrator communication device. Some embodiments may provide an administrator with video images (e.g., snapshot images, thumbshots, or streaming video) of received or requested content. The presentation of video images may be in response to content analysis of metadata associated with a Web site or multimedia program. In some embodiments, thumbshot images are gathered in batch fashion and presented in a streaming thumbshot format for further review by the administrator.

Disclosed embodiments may transmit to an administrator alarms and other data acquired from traditional Web site or uniform resource locator (URL) filtering systems. Identifiers and other metadata for requested content (e.g., Internet website addresses and/or television programming choices) may be sent interactively to a Web portal and to a mobile device in near real time. In this way, a parent or an administrator can immediately become aware of the activity occurring on a monitored computer or television. This enables the administrator (e.g., parent) to be aware of the current activities and make informed decisions regarding the appropriateness and acceptability of requested or received content. The administrator can take immediate action to manage an objectionable situation including requesting thumbshot images of the content currently being viewed and, if he or she chooses to, the administrator can send a pop up warning message to the monitored user (i.e., the viewer) that suspect use has been detected and the monitored user should discontinue the detected use pattern. Some embodiments permit an administrator to respond to questionable activities (e.g., viewing adult content) by blocking or otherwise restricting access to the requested content.

Disclosed systems provide a remote parent or other administrator with monitoring and reporting services regarding content requested by a monitored viewer (e.g., a child). Administrators may be sent metadata associated with requested content dynamically and in real time or near real time. Administrators can also view metadata regarding the requested content from a Web portal, which may enable high-bandwidth for viewing portions of the requested content and integration of other management control options. The ability for administrators to view video images (e.g., streaming video and/or thumbshots) allows a robust monitoring system when compared to traditional log file reviews done in an "after-the-fact," forensic manner. Further, some disclosed systems enable remote management and integration through both Web portals and remote devices. The integration of a pop-up warning message may provide an interactive method to advise the monitored user of concerns without a direct and possibly disruptive modification to existing services or programming.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral may refer to a specific instance of an element and an un-hyphenated form of the reference numeral may refer to the element generically or collectively. Thus, for example, element 121-1 refers to an instance of a set-top box (STB), which may be referred to collectively as STBs 121 and any one of which may be referred to generically as an STB 121. Before describing other details of embodied methods and devices, selected aspects of multimedia content provider networks that provide multimedia programs and other requested content are described to provide further context.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an STB, television, or other form of receiver is required to select a channel from the mixed signal for playing or recording. A user wishing to play or record multiple channels typically needs to have distinct tuners for each desired channel. This can be an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with customer premises equipment (CPE) including, for example, a digital subscriber line (DSL) modem in communication with an STB, a display, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information (e.g., sophisticated and customizable (EPGs)), and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 for monitoring and reporting regarding requested content in accordance with disclosed embodiments. MCDN 100 may deliver multimedia content and Web content that is associated with metadata that includes, for example, an address, title, rating, description, or portion of the underlying contents. MCDN 100, as shown, is a multimedia content provider network that may be generally divided into a client side 101 and a service provider side 102 (a.k.a., server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 miles in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals. In such embodiments, a cable modem termination system (CMTS) may mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements (e.g., emergency alert system messages) from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, an Internet or other type of Web network which is signified in FIG. 1 by the World Wide Web icon 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

As shown in FIG. 1, RG 122 may include elements of a broadband modem such as a DSL or cable modem, as well as elements of a firewall, router, and/or access point for an Ethernet or other suitable local area network (LAN) 123. In some embodiments, STB 121 is a uniquely addressable Ethernet compliant device. Display 124 may be, for example, any National Television System Committee (NTSC) and/or Phase Alternating Line (PAL) compliant display device. Both STB 121 and display 124 may include any form of conventional frequency tuner. As shown, remote control device 126 communicates wirelessly with STB 121 using infrared (IR) or RF signaling. STB 121-1 and STB 121-2, as shown, may communicate through LAN 123.

In IPTV compliant implementations of MCDN 100, clients 120 are configured to receive packet-based multimedia streams from access network 130 and process the streams for presentation on displays 124. In addition, clients 120 are network-aware resources that may facilitate bidirectional-networked communications with server side 102 resources to support network hosted services and features. Because clients 120 are configured to process multimedia content streams while simultaneously supporting more traditional Web like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Live acquisition server 140 is communicatively coupled to an encoder which, prior to transmission, encodes acquired content using for example, MPEG-2, H.263, MPEG-4, H.264, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. The MPEG-2 transport stream may include video and audio portions of a multimedia program including emergency alert system messages for a presentation on a user's display, which may receive one or more signals from a digital television STB, in accordance with disclosed embodiments. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167, which may translate a query to OSS/BSS server 181. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized local loop or RG, client gateway 153 may block transmissions to and from STB 121 beyond the private access network 130.

MCDN 100, as depicted, includes application resources 105, which communicate with private network 110 via application switch 117. Application resources 105, as shown, include application server 160 which is operable to host or otherwise facilitate one or more subscriber applications 165 that are made available to system subscribers. For example, subscriber applications 165, as shown, include EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that monitors viewer requested content, applies a set of administrator configured rules, and reports to an administrator communication device with a message indicative of metadata associated with the requested content. User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

As shown in FIG. 1, monitoring and reporting system 189 (system 189) is enabled for reporting metadata for content requested by RG 122 from MCDN 100. System 189 includes a data collection module (not depicted) for accessing metadata indicative of the content. The data collection module accesses the metadata in response to a viewer (e.g., a user of RG 122) requesting to receive the content. System 189 also includes a network interface (not depicted) for transporting, in real time with the viewer request, the metadata to an administrator communication device. The metadata may include a title, description, classification, score, portion of the content or other information associated with the content. In an embodiment, client 120-2 is a viewer device and client 120-1 includes or embodies an administrator communication device. Examples of metadata that may be transported to client 120-1 as the administrator communication device include, without limitation, a multimedia program type, a multimedia program rating, and a multimedia program title. In addition, portions of the requested content, a classification of the requested content, an address of the requested content, and/or a title of the requested content may be transmitted to client 120-1.

In some embodiments, transporting metadata to the administrator communication device only occurs if the metadata meets or exceeds a predetermined rating. For example, an administrator may configure system 189 to only report instances in which a viewer (e.g., a user of client 120-2) requests a VOD movie (or a Web page) with adult content. In such cases, system 189 includes a processor for determining whether a predetermined condition is met for transporting the metadata to the administrator communication device. Examples of administrator communication devices include without limitation data processing systems (i.e., computers), smart phones, personal data assistants (PDAs), pagers, STBs, other clients for receiving multimedia content (e.g., client 121-1), or wireless telephony devices.

The network interface (not depicted) of system 189 may also operate to receive from client 120-1 for delivery to client 120-2 an administrator input to block the requested content. In some embodiments, metadata that is transported to an administrator may be in the form of an e-mail, an instant message, or a text message. In addition to sending messages to an administrator communication device, system 189 may initiate the transport of administrator messages to a viewer communication device (e.g., display 124-2 within client 120-2). For example, an administrator may send a message to the viewer to stop viewing objectionable content. The viewer communication device that receives the administrator message may be the same device on which the viewer receives the requested content, or the viewer communication device may be separate and communicate over a separate network, such as a cellular network. Accordingly, system 189 may send messages to a viewer communication device in the form of e-mail, text messages, and instant messages sent over cellular network. As shown, system 189 communicates with server side 102 through private network 110. In addition, system 189 is communicatively coupled to public network 112 and may host a Web portal accessible by administrators for receiving data regarding requested content.

Figure 2:
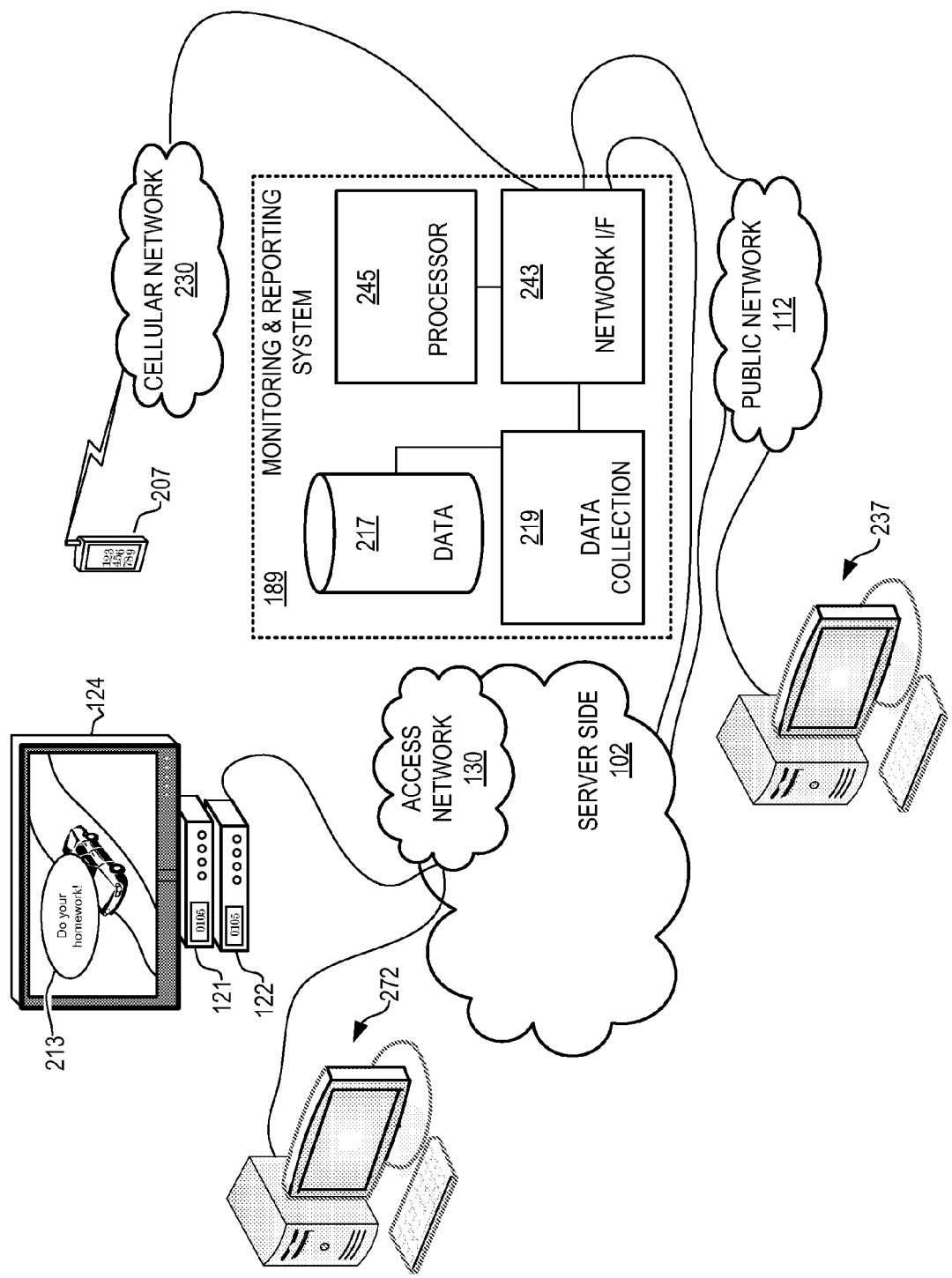
FIG. 2 depicts further details of elements from FIG. 1 including a monitoring and reporting subsystem.

Referring now to FIG. 2, further details from FIG. 1 regarding the system 189 are depicted. System 189 reports metadata for content requested from server side 102. As shown, data processing system 272, in response to user input, requests content from server side 102. Requested content may include, without limitation, live television, VOD movies, Web pages, and photographic files. As shown, system 189 is communicatively coupled to server side 102, which allows system 189 to determine the identity, address, classification, rating, or type of content requested by a user of either data processing system 272 or wireless telephony device.

As shown, system 189 includes processor 245, which is communicatively coupled to data collection module 219 for executing administrator configured data collection instructions to inform an administrator regarding content requested by RG 122 or data processing system 272. Data collection module 219 receives requests from an administrator over network interface 243 from administrator communication device 237 over public network 112 (e.g., an Internet). Similarly, data collection module 219 may receive administrator requests from wireless telephony device 207 over cellular network 230.

In response to an administrator request to monitor content received by RG 122, processor 245 executes instructions from data collection module 219 to communicate with server side 102 and receive identifiers or metadata for requested content. The received metadata may be stored in data storage 217. In some embodiments, data storage 217 stores still shots, video images, or other representations of content received by a viewer (e.g., a user of data processing system 272) or a wireless telephony device (not depicted). Metadata collected by data collection module 219 may be reported over network interface 243, which as shown is communicatively coupled over cellular network 230 to wireless telephony device 207 associated with the administrator. In some embodiments, streaming video that is a portion of the content requested may be provided to wireless telephony device 207 or data processing system 237, which are both administrator communication devices.

As shown in FIG. 2, system 189 may be configured with computer readable instructions to perform a disclosed method of monitoring requested content and reporting metadata for content requested from a multimedia content distribution network (e.g., MCDN 100 from FIG. 1) that includes server side 102 and a portion of access network 130. The disclosed method includes receiving a viewer request to receive the content. The viewer request may be received through remote control device commands processed by STB 121 and relayed by RG 122 to server side 102 through access network 130. As shown, system 189 is communicatively coupled to server side 102 and, in response to a viewer request, is configured to access metadata for the requested content. System 189 may access the metadata from server side 102 or may access and receive the content from third party sources (e.g., third party networks, servers, or Web pages). Example metadata includes but is not limited to: a portion of the requested content, a classification of the requested content, an address of the requested content, and a title of the requested content. As shown, the metadata may be stored to data storage 217, accessed by data collection 219, and provided in one or more messages to administrator communication devices such as wireless telephony device 207 or data processing system 237. As shown, system 189, through network interface 243, processes administrator messages sent to and received from wireless telephony device 207 through cellular network 230.

The communication link between network interface 243 and cellular network 230 may be wire based, wireless, IP based, or use other technologies and protocols. A user (i.e., an administrator) of wireless telephony device 207 or data processing system 237 may provide input that is presented in the form of administrative messages to the user (i.e., a viewer) of display 124 or the user of data processing system 272. As shown, pop-up message 213 is presented as an overlay message on a multimedia program (e.g., a television program) presented on display 124 and instructs the user of display 124 to do homework rather than watch television.

In some embodiments, system 189 receives multimedia content (e.g., thumbshot images) simultaneously with RG 122 from server side 102 and may present the images on wireless telephony device to a sever or to data processing system 237. In some embodiments, a Web portal is accessible through public network 112 and allows users of data processing system 237 or wireless telephony device 207 to access metadata regarding content requested on data processing system 272 through RG 122. The metadata presented on the Web portal or sent to the administrator communication devices may include at least one of: a multimedia program type, a multimedia program rating, and a multimedia program title. The communication of the metadata may be delayed until a predetermined parameter is detected. For example, if a viewer turns to a channel a number of times or views a channel for a predetermined amount of time, system 189 may respond by updating a Web portal with associated metadata or an administrator message to an administrator communication device. In addition, an administrator may provide user input to the administrator communication device or Web portal to block content requested from being sent to RG 122 or data processing system 272 or display 124.

Figure 3:
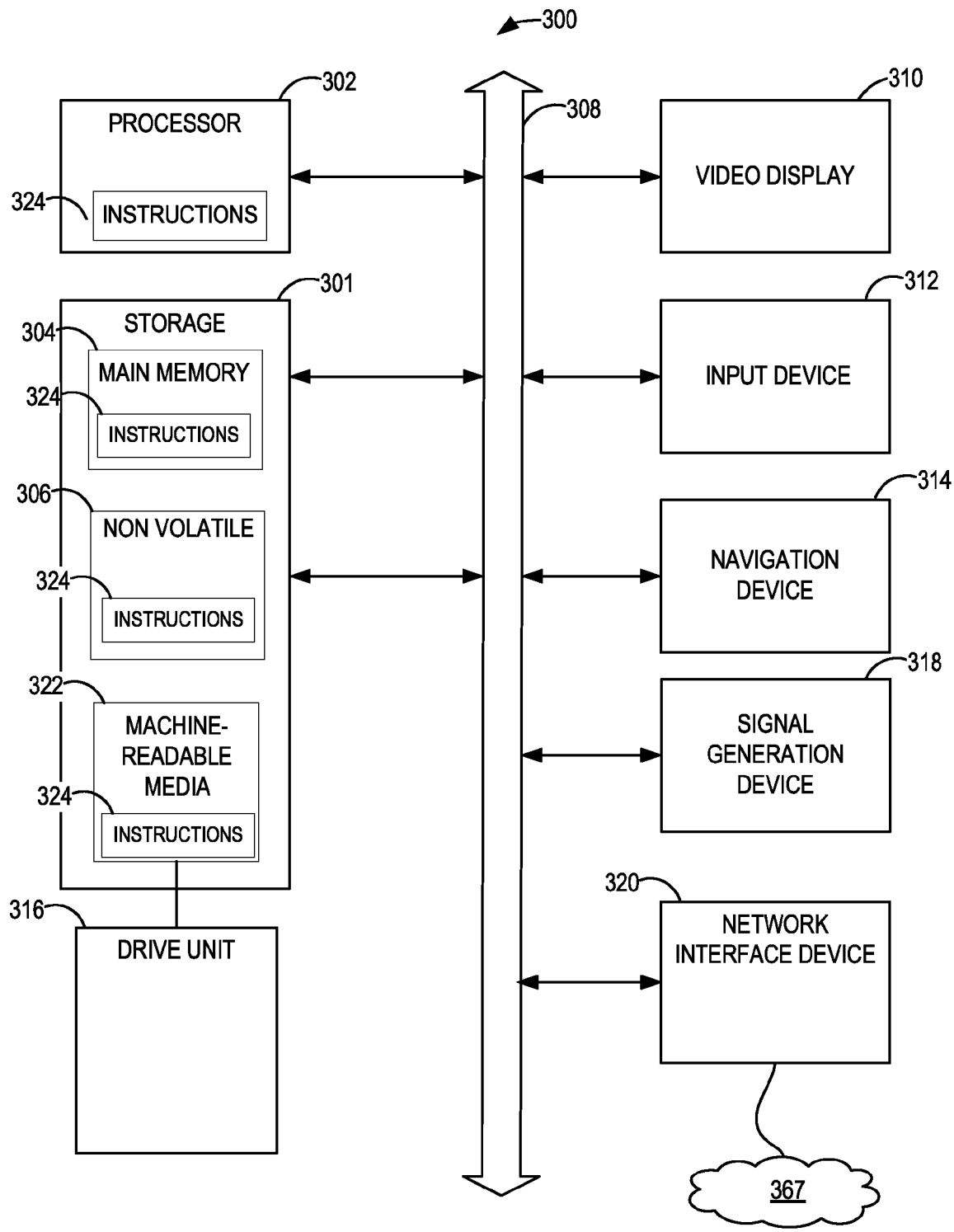
FIG. 3 illustrates a data processing system for use with disclosed embodiments for monitoring and reporting Web usage and television usage.

FIG. 3 illustrates, in block diagram form, selected elements of an embodiment of a data processing system 300 within which a set of instructions operates to perform the methodologies discussed herein. Data processing system 300 may operate as a standalone device or may be connected (e.g., networked) to other data processing systems. In a networked deployment, data processing system 300 may operate in the capacity of a server or a client data processing system in a server-client network environment, or as a peer computer in a peer-to-peer (or distributed) network environment. Example data processing systems include, but are not limited to, an STB, a computer, a client, a digital video recorder, a personal computer (PC), a tablet PC, a cable box, a satellite box, an EPG box, a PDA, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown in FIG. 3, data processing system 300 includes a processor 302 (e.g., a central processing unit, a graphics processing unit, or both) and storage 301 that includes a main memory 304 and a non-volatile memory 306. Disk drive unit 316 and other components of storage 301 communicate with processor 302 via bus 308. Disk drive unit 316 includes a magnetic or solid state machine-readable medium 322 that may have stored thereon one or more sets of instructions 324 and data structures (not depicted) embodying or utilized by any one or more of the methodologies or functions described herein. The instructions 324 may also reside, completely or at least partially, within the main memory 304, within non-volatile memory 306, and/or within the processor 302 during execution thereof by the data processing system 300. In some embodiments, main memory 304 and/or the non-volatile memory 306 may be used to store metadata or other values that relate to multimedia content accessed or requested by a viewer. Data processing system 300 may further include a video display unit 310 (e.g., a television, a liquid crystal display or a cathode ray tube) on which to display Web content, multimedia content and administration message. Data processing system 300 also includes input device 312 (e.g., a keyboard), navigation device 314 (e.g., a remote control device or a mouse), signal generation device 318 (e.g., a speaker) and network interface device 320. Input device 312 and/or navigation device 314 (e.g., a remote control device) may include processors (not shown), and further memory (not shown).

Instructions 324 may be transmitted or received over network 367 (e.g., a multimedia content provider network) via network interface device 320 using any one of a number of transfer protocols (e.g., broadcast transmissions, HTTP). While the machine-readable medium 322 is depicted as a single medium, the term "machine-readable medium" should be construed as including a single medium or multiple media (e.g., a centralized or distributed database, and/or associated caches and servers) that may store all or part of instructions 324. The term "machine-readable medium" shall also be taken to include any medium that is capable of storing, encoding, or carrying a set of instructions (e.g., instructions 324) for execution by a machine (e.g., data processing system 300) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

In accordance with some embodiments, data processing system 300 provides an administrator with monitoring and reporting services associated with content requested by a viewer that may be remotely located from the administrator. Accordingly, instructions 324 include instructions for monitoring content provided to a viewer device, accessing metadata for the monitored content, and transmitting the metadata to an administrator communication device substantially in real time with the monitoring. In some embodiments, the metadata includes video images (e.g., streaming video images) from the content.

Figure 4:
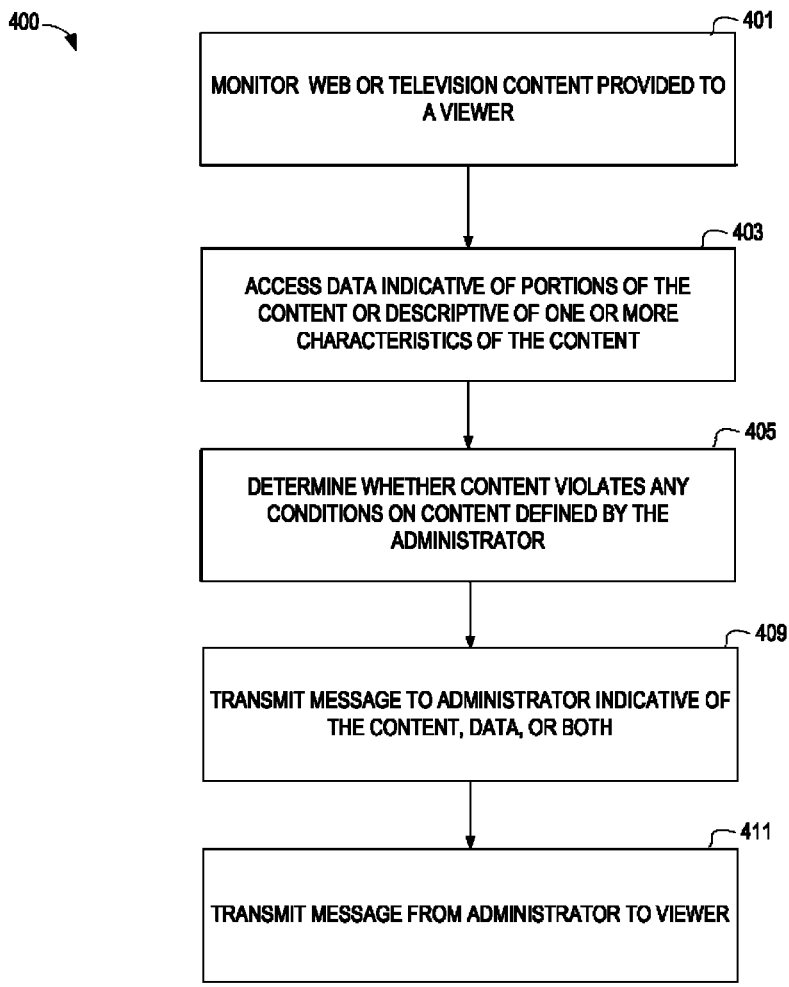
FIG. 4 depicts selected elements of a methodology for monitoring and reporting Web usage and television usage.

FIG. 4 depicts selected operations of an embodiment of a method 400 for monitoring Web usage and television usage and reporting associated metadata to an administrator communication device. Method 400 may be performed by a machine such as data processing system 300 (FIG. 1). As shown, method 400 includes monitoring (block 401) Web or television content provided to a viewer and accessing (block 403) data indicative of portions of the content or descriptive of one or more characteristics of the content. Optionally, methodology 400 may include determining (block 405) whether content violates any conditions on content defined by an administrator. One or more messages are transmitted (block 409) to an administrator. The message(s) are indicative of the content, data, or both. Methodology 400 may also optionally include transmitting (block 411) messages from the administrator to a viewer of the content. For example, an administrator may send pop-up messages to the viewer that suggest the viewer stops viewing objectionable content.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A content monitoring method comprising:
   receiving a request from a viewer to receive multimedia content;
   responsive to determining from metadata indicative of the multimedia content that the multimedia content does not comply with content criteria associated with the viewer, sending a first message to a communication device associated with an administrator wherein the first message includes:
   a streaming portion of the multimedia content for display as a video on the communication device and
   an indication of a title, a rating, and a program type of the multimedia content;
   responsive to determining that the multimedia content complies with content criteria associated with the viewer:
   monitoring an access parameter associated with the viewer and the request;
   responsive to determining that an access parameter does do not comply with an access criterion associated with the user, sending the first message to the communication device;
   responsive to receiving message input from the administrator, overlaying the multimedia content being displayed to the viewer with an administrative message indicative of the message input;
   wherein content criteria includes a criterion based on at least one of: the rating and the program type; and
   wherein the access parameter is indicative of a parameter selected from: a number of times the multimedia content is accessed by the user, a number of times a channel associated with the multimedia content is accessed by the user, and an amount of time the channel is accessed by the user.

2. The method of claim 1, wherein the request is received via a client of the multimedia content distribution network.

3. The method of claim 1, wherein receiving the message input from the administrator comprises receiving the message input from a web portal.

4. The method of claim 3, wherein receiving the message input from the administrator comprises receiving the message input from the communication device.

5. The method of claim 1, wherein the communication device is a wireless telephony device.

6. The method of claim 1, wherein the multimedia content is a multimedia program selected from a broadcast program, a pay per view program, and a video on demand program.

7. The method of claim 1, further comprising:
   responsive to receiving blocking input from the administrator, blocking the multimedia content from being sent to the viewer.

8. A non-transitory computer readable storage device including processor executable instructions that, when executed by a processor, cause the processor to perform operations comprising:
   receiving a request from a viewer to receive multimedia content;
   responsive to determining from metadata indicative of the multimedia content that the multimedia content does not comply with content criteria associated with the viewer, sending a first message to a communication device associated with an administrator wherein the first message includes:
   a streaming portion of the multimedia content for display as a video on the communication device; and
   an indication of a title, a rating, and a program type of the multimedia content; responsive to determining that the multimedia content complies with content criteria associated with the viewer:
   monitoring an access parameter associated with the viewer and the request;
   responsive to determining that an access parameter does do not comply with an access criterion associated with the user, sending the first message to the communication device;
   responsive to receiving message input from the administrator, overlaying the multimedia content being displayed to the viewer with an administrative message indicative of the message input;
   wherein the content criteria includes a criterion based on at least one of: the rating and the program type; and
   wherein the access parameter is indicative of a parameter selected from: a number of times the multimedia content is accessed by the user, a number of times a channel associated with the multimedia content is accessed by the user, and an amount of time the channel is accessed by the user.

9. The computer readable storage device of claim 8, wherein receiving the message input from the administrator comprises receiving the message input from a web portal.

10. The computer readable storage device of claim 8, wherein receiving the message input from the administrator comprises receiving the message input from the communication device.

11. The computer readable storage device of claim 8, wherein the operations include:
    blocking the multimedia content from being sent to the viewer in response to receiving blocking input from the administrator.

12. An access monitoring server system, comprising:
    a processor;
    a computer readable storage device including processor executable instructions that, upon execution by a processor, cause the processor to perform operations comprising:

receiving a request from a viewer to receive multimedia content;

responsive to determining from metadata indicative of the multimedia content that the multimedia content does not comply with content criteria associated with the viewer, sending a first message to a communication device associated with an administrator wherein the first message includes:

a streaming portion of the multimedia content for display as a video on the communication device; and an indication of a title, a rating, and a program type of the multimedia content;

responsive to determining that the multimedia content complies with content criteria associated with the viewer:

monitoring an access parameter associated with the viewer and the request;

responsive to determining that an access parameter does do not comply with an access criterion associated with the user, sending the first message to the communication device;

responsive to receiving message input from the administrator, overlaying the multimedia content being displayed to the viewer with an administrative message indicative of the message input;

wherein the content criteria includes a criterion based on at least one of: the rating and the program type; and wherein the access parameter is indicative of a parameter selected from: a number of times the multimedia content is accessed by the user, a number of times a channel associated with the multimedia content is accessed by the user, and an amount of time the channel is accessed by the user.

13. The system of claim 12, wherein receiving the message input from the administrator comprises receiving the message input from a source selected from: a web portal and the communication device.

14. The system of claim 12, wherein the operations include:

blocking the multimedia content from being sent to the viewer in response to receiving blocking input from the administrator.

* * * * *